United States Patent Office 3,442,730
Patented May 6, 1969

3,442,730
PREFORMED FLOOR SURFACE ARTICLE AND
METHOD OF APPLYING SAME
Donald Albert Dietz, Frostburg, Md., assignor to Johns-Manville Corporation, New York, N.Y., a corporation of New York
No Drawing. Filed Sept. 13, 1965, Ser. No. 487,069
Int. Cl. B32b 19/04
U.S. Cl. 156—71                                  9 Claims This invention concerns floor covering products and specifically those composed of vinyl, vinyl-asbestos or asphalt-asbestos, and to a resinous adhesive applied to the underside thereof. The invention further relates to the method of applying the tile by on-site activation of the adhesive.

The standard method of affixing floor covering or tile to plywood, concrete or old floor tile involves two steps: first, the adhesive must be applied to a large area and allowed to dry, this sometimes requiring several hours during which great care must be taken to exclude dust and dirt from the exposed adhesive; and second, the tile must be placed on the dried adhesive, taking care to align the tile properly before pressing it firmly in place. An alternate method of applying floor tile has been recently publicized with the introduction of a new type of floor tile adhesive. This particular adhesive must be applied to a small area of the surface to be covered, and the tile must be applied to it within a very few minutes, while the adhesive is still wet. Care must be taken to insure that the floor tile has been properly wet by the adhesive.

In certain instances, the tile itself has been coated with an adhesive. The adhesive material employed may be of a permanently sticky character in which case it will be covered with a protecting sheet which is removed when the covering is installed, or may be of a normally non-sticky, non-tacky character but adapted to be activated, as by the application of an appropriate solvent, to impart adhesive properties thereto. Materials of the latter type have been of a relatively non-flexible nature and adapted to harden upon the evaporation of the activating solvent to provide a rigid or semi-rigid bond between the surface covering and the sub-surface. U.S. Letters Patent No. 2,034,927 represents such an approach.

The employment of an adhesive material which is of a relatively non-flexible nature, while advantageous from the standpoint of the final installation obtainable therewith, is disadvantageous from other standpoints. For example, such an adhesive sharply reduces the flexibility of the floor surfacing structure as a whole, rendering it more difficult to roll and unroll, cut, fit, and install. Furthermore, such a non-flexible adhesive tends to crack and chip off when the surface covering is rolled, transported, and handled in the normal course of packaging, distribution, and installation. This result, although it may not impair the serviceability or utility of the product, does give to the goods an unsightly appearance and casts doubt upon its acceptability.

It is obvious that these methods are time consuming and require careful planning by the non-professional user, as well as the experienced contractor. In addition, the adhesives used have the further disadvantage of being water sensitive and therefore not suitable for use on below-grade concrete.

It is therefore a principal object of this invention to provide a new technique for surface covering which may be readily and inexpensively installed to a surface to be decorated.

It is another object of this invention to provide a new floor covering having a solvent activated adhesive which may be inexpensively produced and easily applied to a floor surface.

It is still another object of this invention to provide a method for producing such a surface tile.

Another object of this invention is the provision of an economical method of applying a solvent activated adhesive bearing tile which could permit ready and secure adhesion to the surface to be covered.

Other objects and further scope of applicability of the present invention will become apparent from the detailed description given hereinafter.

The foregoing objects may be satisfied and the previous disadvantages overcome by providing a new flexible solvent activated adhesive coating for floor surfacing structures. The resinous coating which forms a part of my invention comprises a polymer which has been produced by polymerization of a compound, at least 50 percent of which was derived from the monomeric structure:

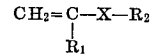

wherein X represents an ester linkage, $R_1$ is hydrogen or a methyl group and $R_2$ is an alkyl radical up to 8 carbons in length. The acrylic resins and polyvinyl acetate are illustrative of such resin materials.

It is desirable in the case of some of the polymers or copolymers, such as those produced by the polymerization reaction between methyl methacrylate and ethyl acrylate and commonly referred to as acrylic resins, to modify them by the admixture with an amine aldheyde resin which may be a copolymer of urea and formaldehyde, melamine and formaldehyde, or other triazine aldehyde resins. Commercially available materials which are typical of these resins are Uformite F-240N, Uformite MM-57, and Uformite MX-61, respectively. In this type of system it has been found that optimum results are obtained when the base resin constitutes between 70 percent and 90 percent by weight of the dry film solids and the remaining solids are contributed by the modifying resin.

The resin coating is applied from an organic solvent solution. Although any volatile solvent or combination of volatile solvents which will solvate, partially solvate, or soften the resinous coating can be used to activate the coating, it is desirable to select the volatile or volatile solvent combination in such a way that the floor tile portion of the product and the skin and hands of the person installing the floor tile are relatively unaffected. It has been determined that a combination of alcohol and water fulfills these requirements. More particularly, it has been found that a combination of isopropanol and water, wherein the isopropanol constitutes 70 percent or more of the combination by weight, gives optimum results. This type of combination of solvents does not attack floor coverings, either asphalt or vinyl types. The concentration of the solvent should be such as to activate the resin in order for it to function as an adhesive, but not so strong as to wash or remove the resin coating.

During normal handling, shipping and storage, the adhesive exhibits little or no tendency to stick either to itself or to other materials such as paper, pasteboard, plywood, concrete or plastics. The resinous coating, however, is activated at any desired time by immersing the product momentarily in a suitable volatile solvent or volatile solvent combination, or thereafter applying the product. The resinous coating portion of the invention will thereupon act as an adhesive of exceptional strength, capable of firmly bonding the floor tile to substrates upon which these floor coverings are normally applied. The covering must be applied promptly—within about a minute—after using adhesive activation. If there is any delay, however, and the adhesive film dries, the covering adhesive can be activated again and applied promptly.

With the above-described resin system, bonds to plywood were obtained which had shear strengths in excess of 100 pounds per square inch. At this tension the ⅛″ tile broke without failure of the adhesive bond. Bonds were also obtained between vinyl asbestos tile and asphalt tile, with bond strength exceeding the tensile strength of the asphalt tile. This simulated the installation of a vinyl asbestos floor over existing asphalt tile. As noted above, synthetic polymer compounds may be used so long as at least 50% of the mixture contains a resin polymer having a basic structure:

$$CH_2=C-X-R_2$$
$$\phantom{CH_2=C}|\phantom{X-R_2}$$
$$\phantom{CH_2=C}R_1$$

wherein X, $R_1$, and $R_2$ are as defined herein. Where acrylic resin based coating are employed, they are preferably combined with a melamine formaldehyde copolymer wherein the base resin constitutes between 70 and 90% by weight of the dry film solids. The coating may be applied in a wet film of between 0.008 and 0.018 inch thick to provide a dry film of between 0.003 and 0.007 inch thick.

One of the most successful resins used was National Starch 1004, a vinyl acetate homopolymer emulsion containing 55 percent resin solids by weight in water. Standard vinyl asbestos floor tiles were coated on the reverse side with a composition comprising 100% vinyl acetate homopolymer. Coating was accomplished by means of a Bird applicator which deposited a wet film approximately 0.006 inch thick. The coating was dried for varying times at 140 to 150° F. and then subjected to blocking tests.

Samples coated with a film of resin 0.004 inch thick when dry were subjected to 10 pounds per square inch pressure for one week at 113° F. All samples were stacked face to back with an uncoated control between each pair of coated experimental samples.

One-inch wide strips of the coated tile were activated by dipping into a solution of 70 parts by weight of isopropyl alcohol and 30 parts of water. They were then laid on one-inch wide strips of plywood and allowed to dry for various periods of time up to 120 hours. The plywood and tile strips were overlapped in such a way that the bond area was one inch by one inch. After drying, the shear strength of the bond was determined on a Thwing Albert tensile tester.

Water sensitivity was also checked by laminating a small piece of tile to plywood, allowing the bond to age for one week at room temperature and then immersing in water continuously for three days. The bond was checked while wet and again after two days' drying time.

Samples of tile were adhered to plywood and then stored at 10° F. for 3 hours. The bond was then checked for embrittlement. The results were very good.

Alkali resistance of the resin adhesives was checked on normal cured asbestos-cement board which, when wet, is more alkaline than fresh concrete. The new adhesives performed satisfactorily.

Table 1 below presents a summary of the performance of the adhesives tested according to the above evaluation.

Table 1

| Test: | Results |
|---|---|
| Blocking | Degree of blocking is no different from that encountered with normal tile production and there is no difficulty separating the tile. |
| Drying time | A drying time of 8 minutes at 140–150° F., in a forced draft oven was desirable followed by 3 minutes of cold air to cool the tile prior to packaging. |

Table 1—Continued

| Test: | Results |
|---|---|
| Bond shear strength | After 24 hours, 82 p.s.i.; after 120 hours, over 100 p.s.i. |
| Water resistance | Good. |
| Ahesion to aged concrete | Excellent. |
| Resistance to low temperature | Very good. |
| Alkali resistance (on normal cured asbestos-cement board) | Excellent. |
| Mechanical stability of the adhesive resin emulsion | Excellent. |

It is believed the above provides a complete description of the invention in such manner as to distinguish it from other inventions and from what is old, and provides a description of the best mode contemplated of carrying out the invention and thereby complies with the Patent Statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein, but only in accordance with the appended claims, when read in the light of the foregoing description.

What I claim is:

1. A preformed floor surface article ready to lay in bonded relation to a sub-surface, comprising a body portion, one surface of which constitutes the wearing surface, an opposite surface constituting the back side thereof, and a coating on said opposite surface which when solubilized will adhere the article to a floor, the coating comprising at least 70% of a polymer which has been produced by the polymerization of a compound, at least 50% of which was derived from the monomeric structure $$CH_2=C-X-R_2$$
$$\phantom{CH_2=C}|\phantom{X-R_2}$$
$$\phantom{CH_2=C}R_1$$

wherein X is an ester linkage, $R_1$ is selected from the group consisting of hydrogen and methyl group, and $R_2$ is an alkyl radical up to 8 carbons in length.

2. An article as defined in claim 1 wherein said compound is selected from the group consisting of acrylate resins, methacrylate resins and polyvinyl acetate resins.

3. An article as defined in claim 1 wherein said coating is acrylic resin based and additionally contains an amine aldehyde copolymer.

4. An article as defined in claim 3 wherein said copolymer is selected from the group consisting of urea aldehyde and triazine aldehyde copolymers.

5. An article as defined in claim 3 wherein said compound constitutes between 70 and 90% by weight of the dry film solids.

6. A method of applying floor surface articles comprising providing a floor surface article comprising a body portion, one surface of which constitutes the wearing surface, an opposite surface constituting the back side thereof, and a coating on said opposite surface comprising at least 70% of a polymer which has been produced by the polymerization of a compound, at least 50% of which was derived from the monomeric structure $$CH_2=C-X-R_2$$
$$\phantom{CH_2=C}|\phantom{X-R_2}$$
$$\phantom{CH_2=C}R_1$$

wherein X is an ester linkage, $R_1$ is selected from the group consisting of hydrogen and methyl group, and $R_2$ is an alkyl radical up to 8 carbons in length, solubilizing said coating by contacting it with a solvent for said coating at a solvent concentration sufficient to actinate said coating and applying said floor surface article to a sub-surface while said coating is still solubilized.

7. A method as defined in claim 6 wherein said solvent is a mixture of water and alcohol.

8. A method as defined in claim 6 wherein said coating additionally contains an amine aldehyde copolymer.

9. A method as defined in claim 6 wherein said compound is selected from the group consisting of acrylate resins, methacrylate resins, and polyvinyl acetate resins.

References Cited

UNITED STATES PATENTS

| | | | |
|---|---|---|---|
| 2,853,463 | 9/1958 | Gaylord | 260—851 |
| 3,090,762 | 5/1963 | Maeder et al. | 260—849 X |
| 3,316,123 | 4/1967 | Savina et al. | 260—851 X |
| 3,362,841 | 1/1968 | Menikheim et al. | 117—138.8 X |
| 3,365,320 | 1/1968 | Minelli | 117—122 X |
| 3,369,959 | 2/1968 | Noyes | 52—746 X |
| 3,382,294 | 5/1968 | Christenson et al. | 260—851 X |
| 2,383,230 | 8/1945 | Voke | 156—308 X |
| 2,677,635 | 5/1954 | Urban et al. | 161—248 X |
| 2,829,068 | 4/1958 | Stewart | 117—161 X |
| 3,048,496 | 8/1962 | Buechler et al. | 117—161 X |
| 3,117,045 | 1/1964 | Schwickert | 156—305 X |
| 3,135,647 | 6/1964 | Wheeley | 156—71 X |
| 3,276,905 | 10/1966 | Porter | 117—75 |
| 3,301,731 | 1/1967 | Ruskin et al. | 156—305 X |

HAROLD ANSHER, *Primary Examiner.*

U.S. Cl. X.R.

52—309, 390, 746, 747; 117—122, 126, 138.8, 161, 168; 156—308; 161—167, 205, 231, 236, 248; 260—851